US011192211B2

United States Patent
Wangenheim et al.

(10) Patent No.: US 11,192,211 B2
(45) Date of Patent: Dec. 7, 2021

(54) MUD MOTOR STATORS AND PUMPS AND METHOD OF MAKING

(71) Applicants: Christoph Wangenheim, Hemmingen (DE); Witali Huber, Laatzen (DE); Frederik Goeing, Wathlingen (DE)

(72) Inventors: Christoph Wangenheim, Hemmingen (DE); Witali Huber, Laatzen (DE); Frederik Goeing, Wathlingen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 149 days.

(21) Appl. No.: 16/698,221

(22) Filed: Nov. 27, 2019

(65) Prior Publication Data

US 2020/0109708 A1 Apr. 9, 2020

Related U.S. Application Data

(62) Division of application No. 15/132,008, filed on Apr. 18, 2016, now Pat. No. 10,527,037.

(51) Int. Cl.
*B23P 15/00* (2006.01)
*F04C 13/00* (2006.01)
*F04C 2/107* (2006.01)

(52) U.S. Cl.
CPC ............ *B23P 15/00* (2013.01); *F04C 13/008* (2013.01); *F04C 2/1071* (2013.01); *F04C 2/1075* (2013.01); *F04C 2230/23* (2013.01); *F04C 2230/92* (2013.01); *F04C 2240/10* (2013.01); *F04C 2240/802* (2013.01); *Y10T 29/49242* (2015.01)

(58) Field of Classification Search
CPC .... F04C 2/1071; F04C 2/1073; F04C 2/1075; F04C 2230/23; F04C 2230/92; Y10T 29/49242; B33Y 80/00; B33Y 10/00
See application file for complete search history.

(56) References Cited

U.S. PATENT DOCUMENTS

| 3,139,035 | A | * | 6/1964 | O'Connor | ............. F04C 2/1073 418/1 |
|---|---|---|---|---|---|
| 3,975,120 | A | | 8/1976 | Tschirky | |
| 3,975,121 | A | | 8/1976 | Tschirky | |

(Continued)

FOREIGN PATENT DOCUMENTS

| CN | 201539210 U | 8/2010 |
|---|---|---|
| CN | 104595182 A | 5/2015 |

(Continued)

OTHER PUBLICATIONS

Notification of Transmittal of the International Search Report and the Written Opinion of the International Searching Authority, or the Declaration; PCT/US2017/026124; dated Jul. 17, 2017; 11 pages.

(Continued)

*Primary Examiner* — Jason L Vaughan
(74) *Attorney, Agent, or Firm* — Cantor Colburn LLP (57) ABSTRACT

A mud motor stator or a pump comprising of a tubular outer portion; a number of lobes extending radially inwardly from the tubular outer portion, at least one of which comprises a skeletal structure and method for producing a mud motor stator or a pump comprising of placing material and bonding the material together in a pattern dictated by the design shape of the stator or pump.

14 Claims, 6 Drawing Sheets

(56) References Cited

U.S. PATENT DOCUMENTS

| | | | |
|---|---|---|---|
| 5,145,342 A | 9/1992 | Gruber | |
| 5,171,139 A | 12/1992 | Underwood et al. | |
| 5,832,604 A | 11/1998 | Johnson et al. | |
| 6,102,681 A | 8/2000 | Turner | |
| 7,192,260 B2 | 3/2007 | Lievestro et al. | |
| 7,396,220 B2 | 7/2008 | Delpassand et al. | |
| 7,442,019 B2 | 10/2008 | Kaiser et al. | |
| 7,621,167 B2 | 11/2009 | Staffend | |
| 7,739,792 B2 | 6/2010 | Lee et al. | |
| 7,832,457 B2 | 11/2010 | Calnan et al. | |
| 7,878,774 B2 | 2/2011 | Speckert | |
| 7,941,906 B2 * | 5/2011 | Downton | E21B 47/01 29/407.05 |
| 7,950,914 B2 | 5/2011 | Hooper et al. | |
| 7,972,129 B2 | 7/2011 | O'Donoghue | |
| 8,197,241 B2 | 6/2012 | Robisson et al. | |
| 8,333,231 B2 | 12/2012 | Hooper et al. | |
| 8,888,474 B2 | 11/2014 | Hohl et al. | |
| 8,985,977 B2 | 3/2015 | Hohl et al. | |
| 9,162,279 B1 | 10/2015 | Pickens | |
| 9,163,629 B2 * | 10/2015 | Lee | F04C 2/1075 |
| 9,309,767 B2 * | 4/2016 | Sreshta | F04C 2/1075 |
| 9,334,691 B2 * | 5/2016 | Jarvis | F03C 2/08 |
| 10,590,929 B2 * | 3/2020 | Rothschild | F04C 2/1075 |
| 2005/0011804 A1 | 6/2005 | Zitka et al. | |
| 2006/0153724 A1 | 7/2006 | Delpassand | |
| 2007/0277651 A1 | 12/2007 | Calnan et al. | |
| 2008/0028891 A1 | 2/2008 | Calnan et al. | |
| 2008/0304991 A1 | 12/2008 | Speckert | |
| 2009/0152009 A1 | 6/2009 | Slay et al. | |
| 2011/0282452 A1 | 11/2011 | Koerner et al. | |
| 2012/0113439 A1 | 5/2012 | Ederer | |
| 2013/0118247 A1 | 5/2013 | Akbari et al. | |
| 2013/0149182 A1 | 6/2013 | Sreshta et al. | |
| 2013/0171019 A1 | 7/2013 | Gessler et al. | |
| 2013/0310961 A1 | 11/2013 | Velez | |
| 2013/0320598 A1 | 12/2013 | Atkins et al. | |
| 2014/0035423 A1 | 2/2014 | Veronesi et al. | |
| 2014/0064997 A1 | 3/2014 | Hohl et al. | |
| 2017/0298933 A1 | 10/2017 | Wangenheim et al. | |

FOREIGN PATENT DOCUMENTS

| | | |
|---|---|---|
| DE | 102012000466 B3 | 4/2013 |
| DE | 102012012076 A1 | 12/2013 |
| DE | 102013108493 A | 2/2015 |
| EP | 2753778 A4 | 9/2011 |
| WO | 2011077150 A2 | 6/2011 |
| WO | 2012024215 A2 | 2/2012 |
| WO | 2013032616 A2 | 3/2013 |
| WO | 2014039393 A1 | 3/2014 |

OTHER PUBLICATIONS

"Moineau Pump"; MakerBot Thingiverse, http://www.thingiverse.com/thing:7958; posted Apr. 21, 2011, retrieved Jul. 16, 2014; 5 pages.

AIMS develops Powder Metallurty stator for oil & gas industries; Powder Metallurty Review; http://sss.ipmd.net/news/002795.html; retrieved Jul. 16, 2014; 2 pages.

\* cited by examiner

MUD MOTOR STATORS AND PUMPS AND METHOD OF MAKING

CROSS REFERENCE TO RELATED APPLICATIONS

This application is a divisional application and claims the benefit of an earlier filing date from U.S. Non-Provisional application Ser. No. 15/132,008 filed Apr. 18, 2016, the entire disclosure of which is incorporated herein by reference.

BACKGROUND

Mud motor stators and pumps are in some cases constructed of hard materials such as metal and sometimes softer materials faced on the metal for sealing purposes. The overall structure is a helical one with lobes extending toward an axis of the stator which makes them difficult to machine and impossible to adjust properties. Since adjustment can improve efficiency of mud motors, the art is always receptive to enhancements in manufacturing processes and functional characteristics of the resulting product.

BRIEF DESCRIPTION

Disclosed herein is a mud motor stator or a pump. The mud motor stator or pump includes a tubular outer portion and a number of lobes extending radially inwardly from the tubular outer portion, at least one of which comprises a skeletal structure.

Also disclosed is a method for producing a mud motor stator or a pump including placing material and bonding the material together in a pattern dictated by the design shape of the stator or pump.

Also disclosed is a method for producing a mud motor stator or a pump including creating a computer model of a stator or pump loading the model into an additive manufacturing apparatus; and operating the additive manufacturing apparatus to produce a physical replica of the model.

Also disclosed is a downhole system including a mud motor stator or a pump, the stator or pump being as defined in any prior embodiment including a tubular outer portion and a number of lobes extending radially inwardly from the tubular outer portion, at least one of which comprises a skeletal structure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
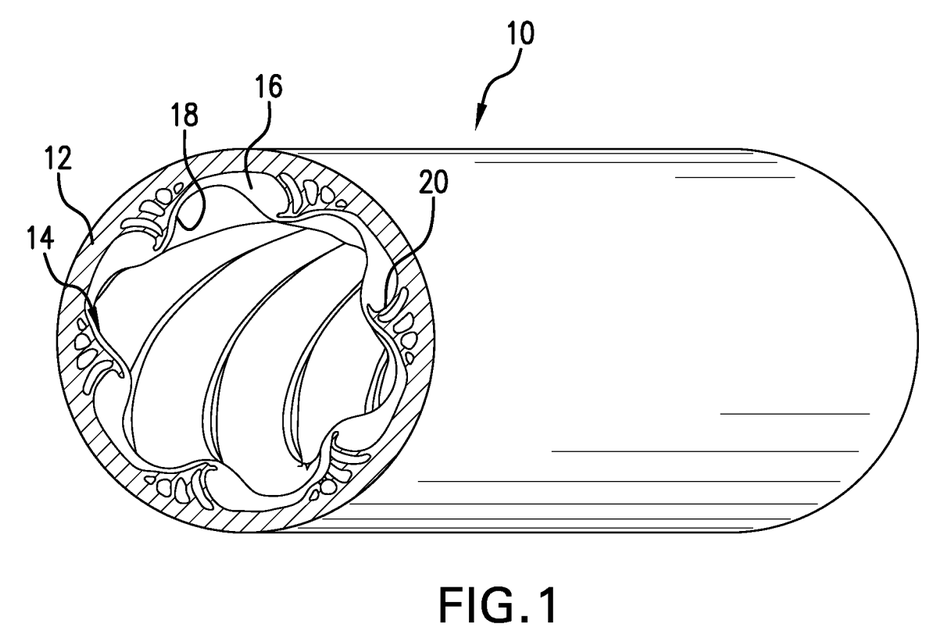
FIG. 1 is a schematic perspective view of a stator for a mud motor as disclosed herein.
Figure 2:
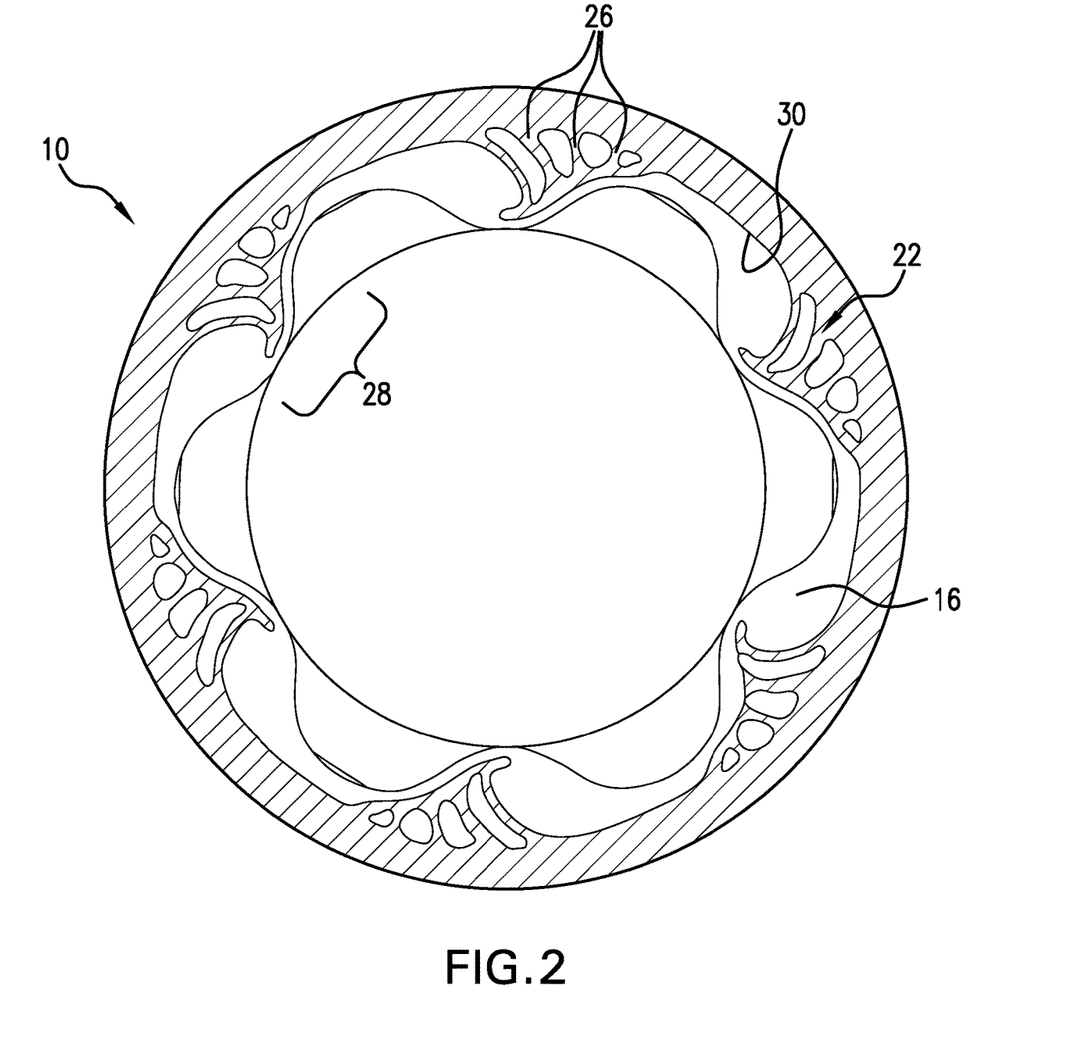
FIG. 2 is an end view of the stator of FIG. 1 illustrating the makeup of the stator.

Referring to FIGS. 1 and 2 simultaneously, stator 10 which may be used in a mud motor or pumps and made part of a downhole system includes a tubular outer portion 12 and a number of lobes 14, which may be asymmetric, extending toward an axis of the stator 10. Also visible is a sealing material 16 disposed radially inwardly of the stator body 10 and which may or may not be disposed symmetrically with the lobes 14. In one embodiment, the sealing material on the seal side is thicker than it is on the load side. The exact positioning and construction of the lobes 14 and material 16 can dramatically affect the function and operation of the stator 10 in terms of sealing capability, vibration reduction, power output, mass, and longevity, among other things.

Weight, material cost, and properties such as resilience, compliance, sealing, load bearing, vibration resonant frequencies, etc. are all important characteristics of the function of a stator but heretofore have not been recognized as such and have not been addressed.

As can be seen in FIGS. 1 and 2, the lobes 14 are not configured as are those of the prior art (solid and sinuous) but rather are configured to provide a greater rigidity on the load side 18 of each stator lobe 14 versus the seal side 20 of each stator lobe 14. Specifically, a skeletal structure 22 is constructed having, in one embodiment just a hollow 24 (FIG. 3) of the lobe 14 and in another embodiment having a number of ribs 26 (FIG. 2). Skeletal structure is defined herein as any configuration of solid portions and open spaces defined between the solid portions to exhibit a framework. The hollow 24 is bounded by an operating portion 28 of the lobe 14. In the FIG. 2 embodiment, the ribs 26 extend from one point to another point inside the otherwise hollow space bounded by the operating portion 28 of the lobe 14. As illustrated in FIG. 2, the ribs 26 extend from the tubular portion 12 radially inwardly until they connect to the operating portion of the lobe 14. Other reinforcing structure patterns are also contemplated. In some embodiments, the load side of the lobe 18 follows a contour that is close to the load surface of the lobe 14. This makes the sealing material 16 thin at this side of the lobe but well supported for high load carrying capability while still providing a sealing function. Conversely, the contour at the sealing side of the lobes 14 is left largely unsupported by the skeletal structure 22. In other embodiments, the lobes are more asymmetric and the sealing material 16 may have the same thickness throughout. See FIG. 4 for a schematic view of an asymmetric lobe pattern. The sealing material 16 often is constructed of rubber though other compounds including metal with adjusted material properties such as density, resilience, etc. is also contemplated herein. In addition, the configuration of the lobes 14 whether symmetric or asymmetric may be optimized to avoid the generation of resonant frequencies during use.

In the FIG. 2 iteration, the ribs 26, (three shown but more or fewer contemplated) are oriented to be substantially normal to the surface of the load side 18 of the lobes 14. This structurally provides great rigidity to the load side of lobe 14 while reducing weight over prior art configurations. As noted, it is contemplated to provide ribs or other structure or shapes in other configurations as well and one purpose of such is to adjust the compliance of the load side of the lobe 14 for applications that may benefit from such.

Figure 3:
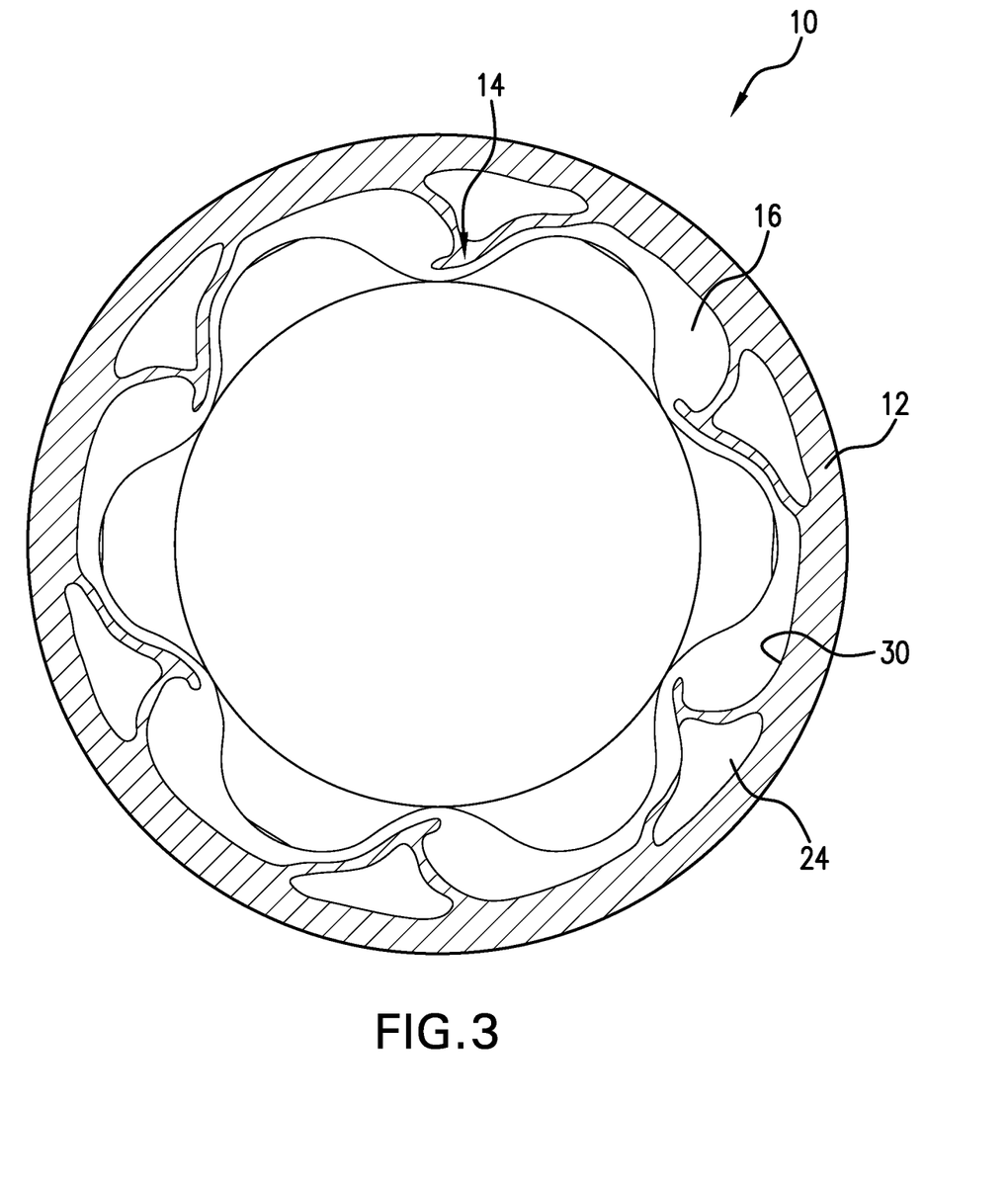
FIG. 3 is an end view similar to FIG. 2 but of an alternate embodiment.
Figure 4:
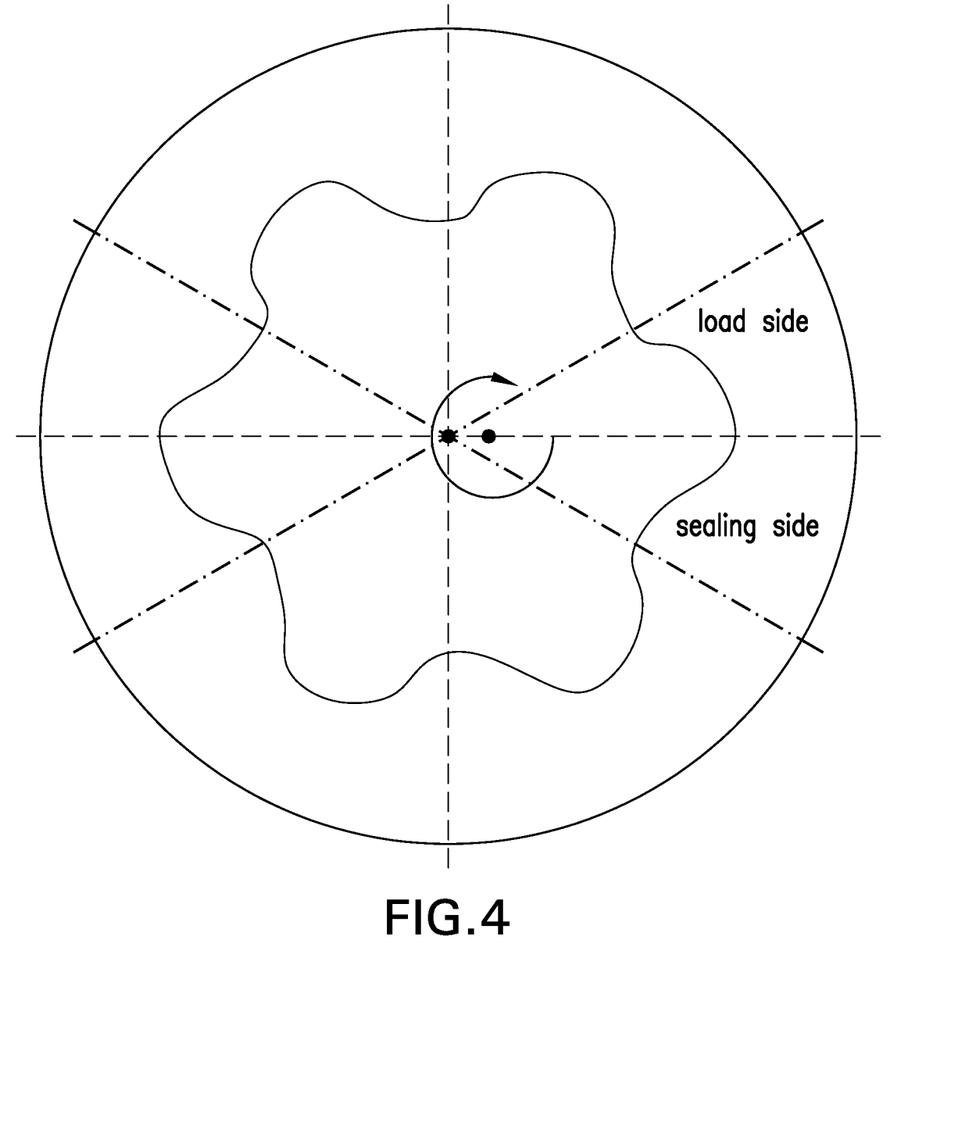
FIG. 4 is a schematic view of an asymmetric lobe pattern.

In FIG. 3, there are no ribs at all but rather merely a hollow 24 within the lobe 14. The sealing material 16 is however the same in the embodiment for purposes of comparison to the embodiment of FIG. 2 and therefore understanding of the concept.

In addition to the structural and weight characteristics of the structures disclosed and shown, it is also to be appreciated that the volume between the ribs 26 or the hollow 24 may be employed as a fluid conduit (conveyance and/or cooling) or a conductor conduit (for electric, hydraulic or optical line).

Figure 5:
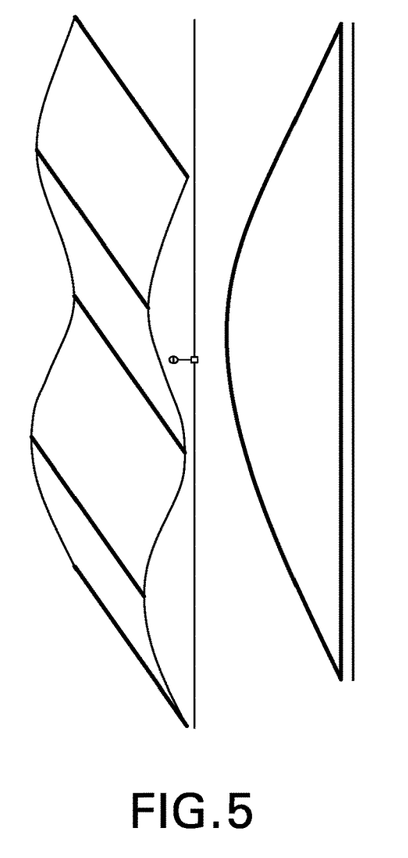
FIGS. 5, 6 and 7 are alternative surface details.
Figure 6:
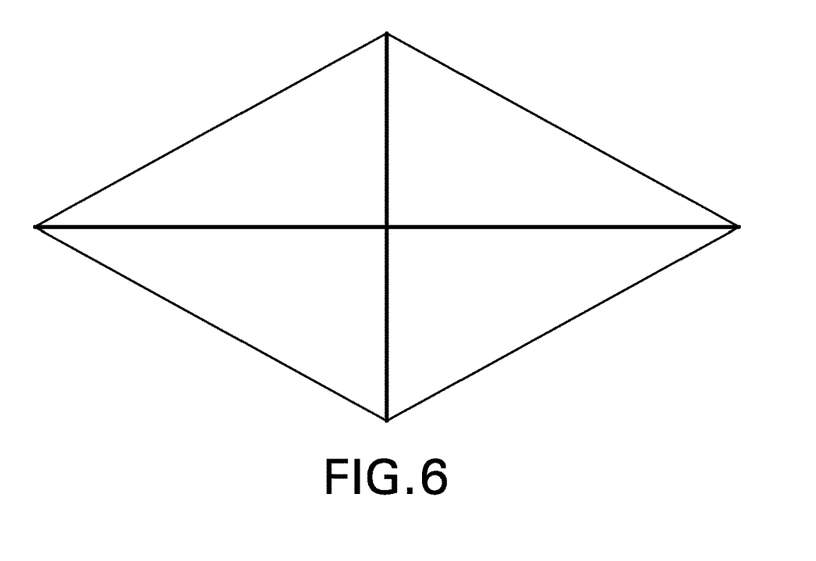
Figure 7:
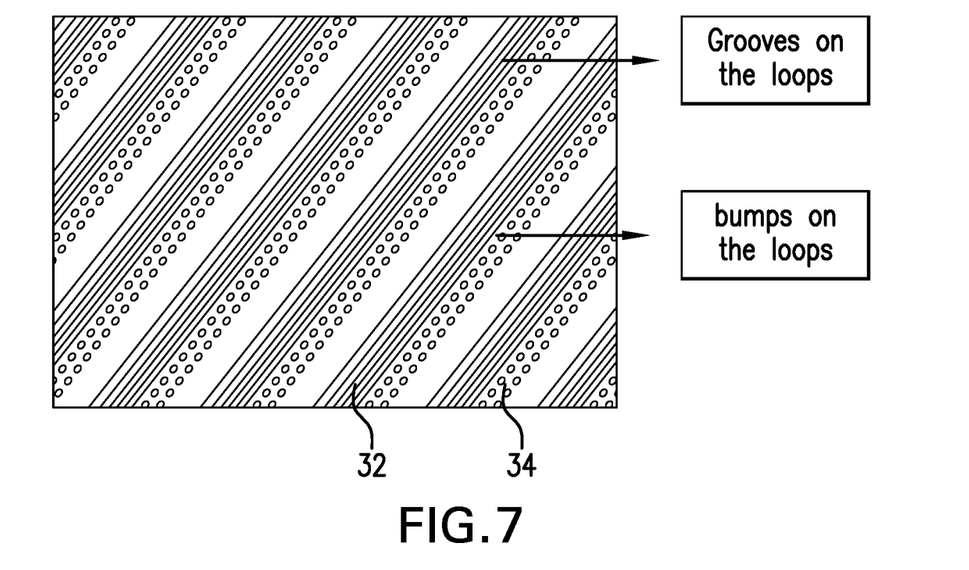

In addition to the overall shape and structure of the lobes 14 as noted above, it is also contemplated herein to change the surface condition on the lobes 14 and the internal surface 30 of the stator body 12. Referring to FIGS. 5, 6 and 7, the surface in some embodiments is randomly roughened, a diamond shaped pattern (FIG. 5), wavy (FIG. 6), having grooves 32 and/or bumps 34 (FIG. 7), etc. for the purpose of increasing adhesion of the material 16 that will be disposed thereon as well as improving the function of the rubber injection process by increasing adhesion and reducing injection pressure and temperature.

The stator or pump 10 may be created by conventional manufacturing methods but would be laborious to achieve. Therefore the inventors hereof also note that additive manufacturing or 3D printing is highly suited to producing all of the features noted above with respect to the various alternate embodiments of a stator or pump disclosed herein. Each of the stator or pump embodiments may be created using one or more of selective laser melting, direct metal laser sintering, direct metal laser melting, selective laser sintering, electron beam manufacturing, direct laser deposition, cold gas processing, laser cladding, direct material deposition, ceramic additive manufacturing, ultrasonic welding, or binder jetting and subsequent sintering, for example in powder bed or nozzle feed or wire feed configurations. The material deposited is bonded together by welding, binding and sintering, etc. Additive manufacturing processes are known to the art and require no specific discussion in connection with this disclosure.

In each of the additive manufacturing processes noted above (or others functioning similarly) the complex shapes represented in the figures are easily created in the layer by layer or particle by particle approach of additive manufacturing processes. In addition to the overall shape as shown, AM also supports the other adjustments discussed above with respect to density, resilience, compliance, etc. (see above) of the material used to make the stator 10, to wit: one of the operating parameters of the process may be modified to produce a material property in a location within the stator 10 that is different than that material property elsewhere in stator 10. For example, the process of melting may be halted where an opening is to be located. Alternatively or additionally, the process may be altered to change the density of the base material in certain areas to cause a feature to be resilient or compliant.

In order to change properties as noted above, changes in one or more parameters of the additive manufacturing process used to create the material may be made. These changes include but are not limited to: varying the energy applied to the feed material by the energy source e.g. laser or electron beam (varying the energy source power including zero power, varying the energy source focus, varying the energy source scanning speed, varying the energy source line spacing) or varying the feed material itself may be employed. More specifically, with respect to energy applied, the energy source being employed, whether e.g. 200, 400, 1000 W or any other energy source power, may be reduced in power at the selected location to reduce the melting of the powdered (or other type) feed material. Reduction in the amount of melt will change the density of the manufactured part in locations where melting was reduced or eliminated in the case of zero power (which will simply leave feed material unaltered, e.g. still powdered). Alternatively, one may change the energy source focus, which also changes the energy applied to the feed material. Further, another alternative is to change the laser energy source scanning speed to alter the energy imparted to the feed material in certain locations. Varying the line spacing of the scanning energy source results in altered porosity or density of the stator 10 in locations where line spacing diverges from otherwise normal line spacing for the part. Causing line spacing to become larger will result in a lower density and greater porosity of the stator 10 in those areas in which line spacing is increased. Each of these will change the degree of fusing of the feed material at that location with the surrounding particles of feed material and hence change the density or porosity of the final manufactured product at that location. It is to be understood that other material properties such as thermal conductivity, electrical conductivity, magnetism, etc. may also be altered using processes that change feed materials.

While reducing energy applied is discussed above it is also important to note that energy increase can also be useful in achieving specific material properties desired in the Stator 10. Increasing energy source power will tend to vaporize the powdered metal thereby leaving porosity.

Referring back to the other identified method for altering the material properties in a stator that does not rely upon energy supplied, the feed material itself may be altered. This may be accomplished by changing the material supplied at a feed head for powdered feed material or by changing the wire composition in a wire feed process. Processes capable of additive manufacturing with different materials include cold gas processes, energy source cladding or direct laser deposition, for example.

Materials contemplated for construction of the stator or pump include fine particles of or a wire including metal and/or metal alloy material and may optionally further include plastic, ceramic, and/or organic material. More specifically, material may include, for example, cobalt, nickel, copper, chromium, aluminum, iron, steel, stainless steel, titanium, tungsten, or alloys and mixtures thereof, magnetically responsive materials, polyetheretherketone (PEEK™), carbon-based materials (e.g., graphite, graphene, diamond, etc.), and/or glass. Specific, nonlimiting examples, of materials that may be employed include PA12-MD(Al), PA12-CF, PA11, 18Mar 300/1.2709, 15-5/1.4540, 1.4404 (316L), Alloy 718, Alloy 625, CoCrMo, UNS R31538, Ti6Al4V and AlSi10Mg, Alloy 945x, 17-4/1.4542, Alloy 925, CrMnMoN-steel, CoCrAlloys (STELLITE®), CoNi-Alloy, MP35 or equivalent, 4140, 4145, WC-Ni, WC—Co, and/or W. Another example of material employed is fine particles of metal or metal alloy material intermixed with fine particles of ceramic material, the material being configured to form a metallic-ceramic composite material (e.g., a cermet), in which ceramic particles are embedded within a metal or metal alloy matrix, upon melting and coalescence of the particles of metal and/or metal alloy material. More specifically, these materials may be fine particles of cobalt, nickel, iron, steel, stainless steel, or alloys and mixtures thereof intermixed with fine particles of tungsten carbide, titanium carbide, tantalum carbide, molybdenum carbide, and other metal-carbide ceramic materials.

Figure 8:
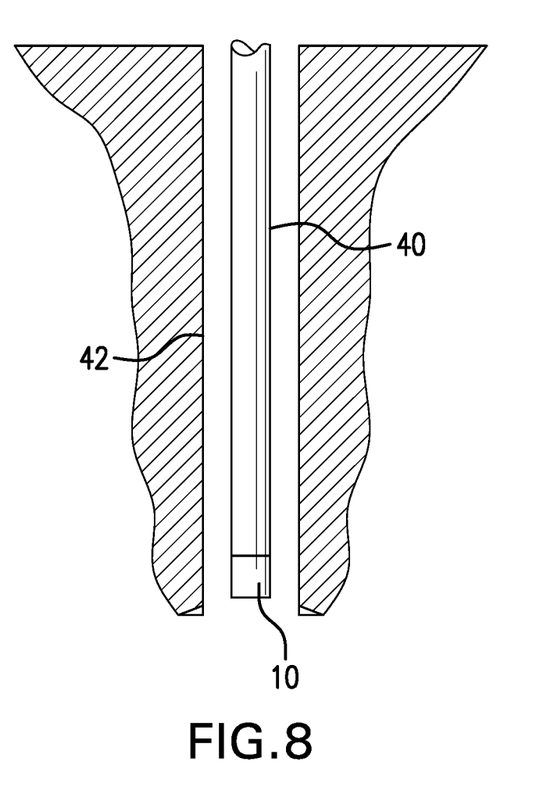
FIG. 8 is a schematic representation of a downhole system including the stator or pump as disclosed herein.

Referring to FIG. 8, a downhole system is schematically illustrated having a stator or pump as disclosed herein disposed therein. The system comprises a string 40 disposed in a borehole 42, the string including a stator or pump 10.

Set forth below are some embodiments of the foregoing disclosure:

Embodiment 1: A method for producing a stator including placing material and bonding the material together in a pattern dictated by the design shape of the stator the shape including a number of lobes, at least one of which having a skeletal structure, at least one of the number of lobes having a load side and a seal side, the seal side being less supported by the skeletal structure than the load side.

Embodiment 2: The method as in any prior embodiment, wherein the bonding is by direct metal laser melting.

Embodiment 3: The method as in any prior embodiment, wherein placing and bonding is part of an additive manufacturing process.

Embodiment 4: The method as in any prior embodiment, wherein the additive manufacturing process comprises a layer by layer or particle by particle approach.

Embodiment 5: The method as in any prior embodiment, wherein the bonding is by one of welding, binding and sintering.

Embodiment 6: The method as in any prior embodiment, wherein an operating parameter of the additive manufacturing process is modified to produce a material property in a location within the stator that is different than that material property elsewhere in stator.

Embodiment 7: The method as in any prior embodiment, wherein the material is metal or metal alloy.

Embodiment 8: The method as in any prior embodiment, wherein the metal or metal alloy comprises at least one of cobalt, nickel, copper, chromium, aluminum, iron, steel, stainless steel, titanium, and tungsten.

Embodiment 9: The method as in any prior embodiment, wherein the material is at least one of polyetheretherketone, carbon-based material, and glass.

Embodiment 10: The method as in any prior embodiment, wherein the material is metallic-ceramic composite material.

Embodiment 11: The method as in any prior embodiment, further comprising disposing a sealing material on the seal side.

Embodiment 12: The method as in any prior embodiment, wherein the skeletal structure comprises an innermost asymmetric surface and at least a portion of the innermost asymmetric surface is conditioned.

Embodiment 13: The method as in any prior embodiment, wherein the condition exhibits a diamond shaped pattern.

Embodiment 14: A method for producing a stator including creating a computer model of a stator having a number of lobes, at least one of which comprises a skeletal structure, at least one of the number of lobes having a load side and a seal side, the seal side being less supported by the skeletal structure than the load side; loading the model into an additive manufacturing apparatus; operating the additive manufacturing apparatus to produce a physical replica of the model.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for producing a stator comprising:
placing material and bonding the material together in a pattern dictated by a design shape of the stator, the design shape including a number of lobes, at least one of which having a skeletal structure, at least one of the number of lobes having a load side and a seal side, the seal side being less supported by the skeletal structure than the load side.

2. The method as claimed in claim 1, wherein the bonding is by direct metal laser melting.

3. The method as claimed in claim 1, wherein the placing and the bonding is part of an additive manufacturing process.

4. The method as claimed in claim 3, wherein the additive manufacturing process comprises a layer by layer or particle by particle approach.

5. The method as claimed in claim 1, wherein the bonding is by one of welding, binding and sintering.

6. The method as claimed in claim 3, wherein an operating parameter of the additive manufacturing process is modified to produce a material property in a location within the stator that is different than that material property elsewhere in stator.

7. The method as claimed in claim 1, wherein the material is metal or metal alloy.

8. The method as claimed in claim 7, wherein the metal or metal alloy comprises at least one of cobalt, nickel, copper, chromium, aluminum, iron, steel, stainless steel, titanium, and tungsten.

9. The method as claimed in claim 1, wherein the material is at least one of polyetheretherketone, carbon-based material, and glass.

10. The method as claimed in claim 1, wherein the material is metallic-ceramic composite material.

11. The method as claimed in claim 1, further comprising disposing a sealing material on the seal side.

12. The method as claimed in claim 1, wherein the skeletal structure comprises an innermost asymmetric surface and at least a portion of the innermost asymmetric surface is conditioned.

13. The method as claimed in claim 12, wherein the condition exhibits a diamond shaped pattern.

14. A method for producing a stator comprising:
creating a computer model of a stator having a number of lobes, at least one of which comprises a skeletal structure, at least one of the number of lobes having a load side and a seal side, the seal side being less supported by the skeletal structure than the load side;

loading the model into an additive manufacturing apparatus;

operating the additive manufacturing apparatus to produce a physical replica of the model.

\* \* \* \* \*